Nov. 11, 1930. T. A. CLARKSON 1,781,163
ANIMAL TRAP
Filed June 14, 1929
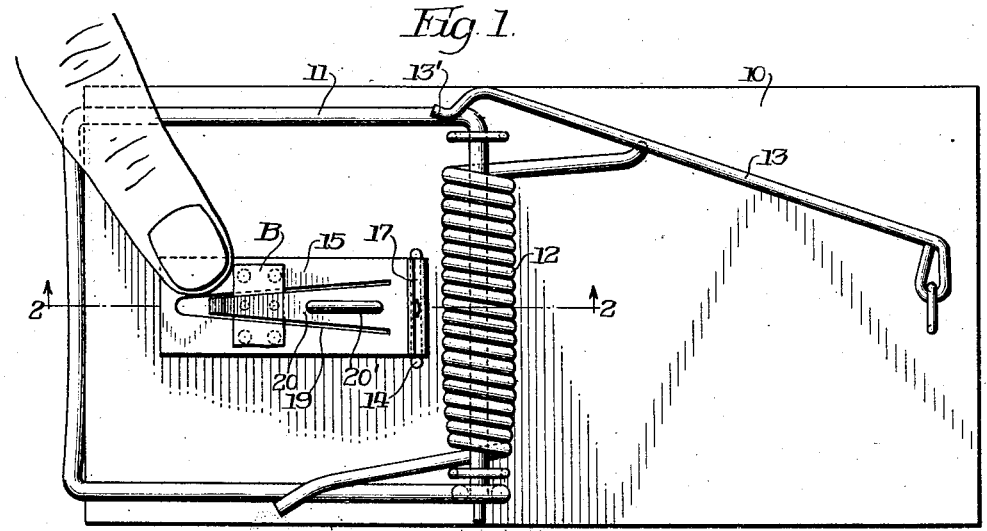
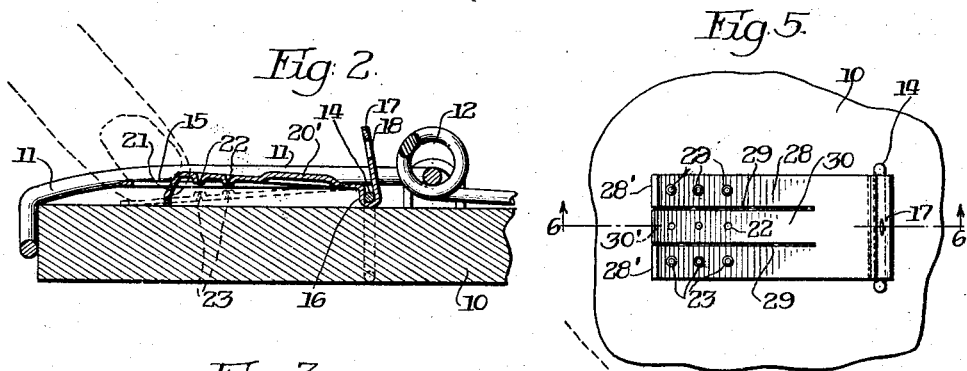
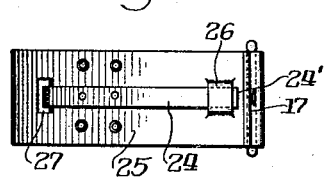
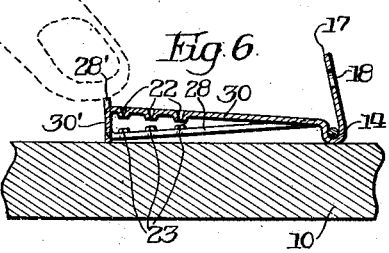
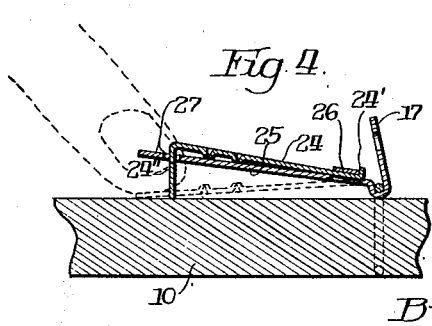
Inventor
Thomas A. Clarkson
By Fisher Clapp, Soans & Pond, Attys Patented Nov. 11, 1930

1,781,163

UNITED STATES PATENT OFFICE

THOMAS A. CLARKSON, OF NASHVILLE, TENNESSEE

ANIMAL TRAP

Application filed June 14, 1929. Serial No. 370,771.

This invention relates to the art of animal traps, and has reference more particularly to an improved bait holder and trigger for such traps.

In one well known type of mouse trap, the trigger which maintains the spring under tension, when the trap is set, includes a bait holder, usually in the form of a narrow plate variously equipped to hold the bait. In some traps now on the market the bait holder is formed with a spear head projection on which the bait is impaled. In others, the bait holder is formed with a shallow depression or pocket in which a soft bait, such as cheese, is impressed. Still other more or less efficient bait holders are known.

One object of my present invention is to provide an improved bait holder which will very securely retain the bait thereon, and prevent the theft of the bait by the animal without springing the trap. Another object is to provide a bait holder which will render simple and easy the application of the bait thereto. A still further object of the invention is to provide a combined trigger and bait holder that can be manufactured by simple die punch operations, that will be of low cost, and that will be adaptable to all forms of animal traps.

Still other objects and attendant advantages of the invention will be apparent to persons familiar with the art to which the invention pertains from the following detailed description, taken in connection with the accompanying drawings in which I have illustrated slightly differing embodiments of the principle of the invention, and wherein—

Fig. 1 is a plan view of a well known form of mouse trap, having my improved trigger and bait holder applied thereto.

Fig. 2 is a vertical longitudinal section taken on the line 2—2 of Fig. 1.

Fig. 3 is a fragmentary plan view showing a modified form of trigger and bait holder.

Fig. 4 is a vertical longitudinal section taken on the line 4—4 of Fig. 3.

Fig. 5 is a fragmentary plan view, illustrating another modification.

Fig. 6 is a vertical longitudinal section taken on the line 6—6 of Fig. 5.

Referring first to the form of the invention illustrated in Figs. 1 and 2, 10 designates the rectangular base plate, 11 the pivoted jaw frame, 12 the helical spring actuating the jaw frame, and 13 the jaw retaining lever of a well known form of mouse and rat trap, with the structural details of which my present improvement is not concerned.

Pivoted on a staple 14 just in advance of the spring 12 is one form of my improved trigger and bait holder, and same comprising a one-piece structure consisting of a bait holding plate 15, a depending hinge 16 embracing the pivot staple 14, and an upstanding lever catch 17 formed with an aperture 18 to engage with the downwardly offset tip 13' of the lever 13.

This trigger and bait holder is formed from a thin strip of resilient sheet metal, and lengthwise of the bait plate 15 is cut a narrow oblong slot 19, which forms between the opposite sides of said slot a tongue 20. To stiffen the tongue 20, the latter may be formed throughout approximately the rear longitudinal half thereof with an upwardly pressed rib 20', but this latter feature is not indispensable and may be omitted where the metal of the bait plate possesses considerable stiffness.

The free end or tip of the tongue 20 is bent downwardly, as clearly shown at 21 in Fig. 2, to rest on the upper surface of the base plate 10 when the trap is not set, at which time the plate 15 lies at a slight elevation above the base plate 10, as shown by full lines in Fig. 2.

To bait the trap, the free end of the plate 15 is simply depressed by the finger, as shown in Figs. 1 and 2, to the dotted line position shown in Fig. 2, thus spacing the plate 15 below the plane of the tongue 20, and a slice of bacon, cheese, or other bait, indicated at B in Fig. 1, is readily passed endwise through the space between the plate and tongue, and the instant the pressure of the finger is relieved, the plate and tongue spring toward each other, so that the bait is securely clamped between them. An auxiliary grip on the bait may be secured by forming small depending teeth 22 in the tongue 20, and small upstanding teeth 23 in the plate 15 on opposite sides of the tongue. These teeth are readily formed by simply pricking the metal, which can be done by the die in the same operation that stamps out the trigger and cuts out the tongue.

In the form of the invention illustrated in Figs. 3 and 4, the tongue 24 is not cut and bent to shape from the metal of the bait holder 25, but is a separate strip of steel or other spring metal, the rear end of which is attached to the plate 25 as by being inserted through a low upset loop 26 cut and bent from the plate 25 in the die operation which forms the plate 25; the rear end of the tongue being bent upwardly as shown at 24' to prevent the tongue from pulling away. The forward end portion of the plate 25 is formed with a transverse slot 27 through which the downwardly bent portion or tip 24'' of the tongue is inserted. In this construction the bait is applied and gripped in the same manner as above explained in connection with Figs. 1 and 2, the plate 25 and tongue 24 normally lying in contact with each other, as shown by full lines in Fig. 4, and the plate 25 being depressed by the thumb or finger to the dotted line position for the application of the bait, while the tongue 24 is maintained elevated through the engagement of its tip 24'' with the base plate 10. This construction possesses at least two advantages over that disclosed in Figs. 1 and 2. In the first place, a better quality of spring metal than that of the plate may be employed for the tongue; and in the second place, the length of the tongue is not limited by the length of the plate, so that the downwardly bent tip portion 24'' can be made long enough to afford a wider spread of the tongue and plate for the insertion of the bait than is possible in the construction shown in Figs. 1 and 2.

The form of the invention illustrated in Figs. 5 and 6 is generally similar to that shown in Figs. 1 and 2, the tongue being formed integral with the plate, but in this construction the bait plate 28 is formed with a pair of longitudinal slits 29, extending through the free end of the plate and forming between them the spring tongue 30. The free end portion 30 is bent downwardly forming the tip 30' that functions in the same way as the tip 21 of Figs. 1 and 2 and the tip 27 of Figs. 3 and 4, and the free end portions of the plate 28 lying on either side of the tongue 29 are preferably bent upwardly, as shown at 28' to form convenient points of application of the fingers when applying the bait.

It will be observed that in all of the forms of the invention illustrated, the bait can be readily slipped endwise between the tongue and the plate by simply depressing the free end of the latter, the tongue being maintained elevated by the engagement of its depending tip with the base plate of the trap, and the instant the pressure on the plate is relieved the bait plate and tongue spring toward each other and securely grip the bait between them, so that it is impossible for the animal to pull the bait away from its anchorage, and this spring grip of the bait holder on the bait is enhanced by the cooperating teeth which may be employed in all of the forms of the invention shown, the teeth being provided on the plate, or on the tongue, or on both. Furthermore, in the application of the invention to traps which may not employ a base plate, or wherein the free end of the trigger may overhang the end of the base plate, the tongue and bait plate can be spread for the insertion of the bait therebetween by simply compressing the ends of the bait plate and tongue between the thumb and finger. The invention is thus applicable to other forms of animal traps than the mouse or rat trap herein illustrated.

I have herein shown and described three simple and practical embodiments of the invention, but it is manifest that the principle thereof is capable of embodiment in still other specifically differing forms, and hence I do not limit the invention to the practical forms shown, or to its application to any particular form of animal trap, except to the extent indicated in specific claims, but reserve all such variations, modifications, and mechanically equivalent constructions as fall within the spirit and purview of the claims.

I claim:

1. In an animal trap, a bait holding trigger comprising a bait plate, and a spring tongue connected at one end to said plate and having a depending tip portion extending below said plate to form a bearing portion whereby said plate may be depressed below said tongue so that bait may be clampingly engaged therebetween.

2. In an animal trap, a bait holding trigger comprising a slotted bait plate, and a spring tongue connected at one end to said plate and having a depending tip portion extending through the slot of said plate to form a bearing portion whereby said plate may be depressed below said tongue so that bait may be clampingly engaged therebetween.

3. In an animal trap, a bait holding trigger, comprising a bait plate, and a spring tongue connected at one end to said plate and having a depending tip portion extending below said plate to form a bearing portion whereby said plate may be depressed below said tongue so that bait may be clampingly engaged therebetween, said plate and tongue being formed with teeth adapted to grip a bait inserted between them.

4. In a trap of the class described, the combination with a base, of a bait-holding trigger mounted thereon, said trigger including a metal plate hinged to said base, and a spring tongue connected at one end to said plate and having a downwardly turned tip portion extending below said plate adapted to strike said base; whereby, when a free end of said plate is depressed said plate and tongue are spaced for the lateral insertion of the bait therebetween, and when said plate is released the bait is clamped between said plate and tongue.

5. In a trap of the class described, the combination with a base, of a bait-holding trigger mounted thereon, said trigger including a slotted metal plate hinged at one end to said base, and a spring tongue connected at one end to said plate and having a downwardly turned tip portion extending through the slot of said plate and adapted to strike said base; whereby, when the free end of said plate is depressed said plate and tongue are spread apart for the lateral insertion of the bait therebetween, and when said plate is released the bait is clamped between said plate and tongue.

6. In a trap of the class described, the combination with a base, of a bait-holding trigger mounted thereon, said trigger including a metal plate hinged at one end to said base, and a spring tongue integral at one end with said plate and formed with an integral downwardly turned tip portion extending below said plate and adapted to contact with said base when the free end of said plate is depressed, whereby to separate said tongue and plate for the lateral insertion of the bait therebetween.

7. In a trap of the class described, the combination with a base, of a bait-holding trigger mounted thereon, said trigger including a metal plate hinged at one end to said base, said plate being slotted to form a tongue, and said tongue having a depending tip portion projecting below said plate and adapted to contact with said base when the free end of said plate is depressed, whereby to separate said tongue and plate for the lateral insertion of the bait therebetween.

8. In a trap of the class described, the combination with a base, of a bait-holding trigger mounted thereon, said trigger including a metal plate hinged at one end to said base, said plate being slotted longitudinally between its ends to form a tongue, and said tongue being formed with an integral downwardly turned tip portion projecting through the slot of said plate and adapted to contact with said base when the free end of said plate is depressed, whereby to separate said tongue and plate for the lateral insertion of the bait therebetween.

9. In a trap of the class described, the combination with a base, of a bait-holding trigger mounted thereon, said trigger including a substantially flat metal plate hinged at one end to said base, said plate being slotted longitudinally between its free end and its hinge to form a tongue, and said tongue being formed with an integral downwardly turned tip portion projecting through the slot of said plate and adapted to contact with said base when the free end of said plate is depressed, and downwardly and upwardly projecting teeth on said tongue and plate respectively adapted to grip the bait when inserted between them.

THOMAS A. CLARKSON.